(12) United States Patent
Bhose et al.

(10) Patent No.: US 11,494,366 B1
(45) Date of Patent: Nov. 8, 2022

(54) CHANGE DATA CAPTURE ON NO-MASTER DATA STORES

(71) Applicant: Oracle International Corporation, Redwood Shores, CA (US)

(72) Inventors: Rajarshi Bhose, Bangalore (IN); Dwijen Bhattacharjee, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/390,639

(22) Filed: Jul. 30, 2021

(30) Foreign Application Priority Data

May 25, 2021 (IN) .............................. 202141023310

(51) Int. Cl.
*G06F 16/23* (2019.01)
*G06F 16/28* (2019.01)

(52) U.S. Cl.
CPC ........ *G06F 16/2358* (2019.01); *G06F 16/284* (2019.01)

(58) Field of Classification Search
CPC ............................ G06F 16/2358; G06F 16/284
See application file for complete search history.

(56) References Cited

U.S. PATENT DOCUMENTS

| 2015/0120649 | A1* | 4/2015 | Nakadai | G06F 3/067 707/609 |
| 2016/0127808 | A1* | 5/2016 | Wong | H04M 15/08 379/112.04 |
| 2018/0341691 | A1* | 11/2018 | Ekbom | G06F 16/2322 |
| 2021/0165789 | A1* | 6/2021 | Deshpande | G06F 11/3495 |

* cited by examiner

*Primary Examiner* — Kuen S Lu
(74) *Attorney, Agent, or Firm* — Kilpatrick Townsend & Stockton LLP

(57) ABSTRACT

The present embodiments relate to implementing change data on no-master NoSQL data stores. An optimized node can be identified from a plurality of NoSQL data storage nodes and a specialized node can be connected (e.g., collocated) to the optimized node. The specialized node can maintain change data capture (CDC) data provided by client nodes in a hash map that can be used as a point of truth for coordinating CDC data across the plurality of NoSQL data storage nodes. The plurality of NoSQL data storage nodes can identify and coordinate all read/write data obtained from multiple client devices in a geographically separated large-scale (e.g., planet scale) system to identify change data in a distributed data store. The specialized data can provide read data to devices in the large-scale system to reconcile inconsistencies in change data across nodes in the large-scale system.

20 Claims, 10 Drawing Sheets

CHANGE DATA CAPTURE ON NO-MASTER DATA STORES

BACKGROUND

In many instances, change data capture (CDC) can be used with relational database management systems (RDBMSs). However, with a NoSQL data store, CDC may be loosely implemented using distributed log-based approaches (e.g., consensus algorithms). However, such approaches may not take into account large-scale (e.g., global scale) no-master data stores, network delays in large-scale systems, or maintain consistency across the nodes. Particularly, read/writes can occur simultaneously or frequently across the nodes in the large-scale and geographically separated stores (e.g., planet scale stores), which can lead to inconsistencies of the read/writes.

Various techniques can be implemented to attempt to mitigate inconsistences of read/writes across a large-scale distributed or planet scale system. For example, tunable/ eventual consistency algorithms (e.g., a Basic (B) Availability (A), Soft-state (S), Eventual consistency (E) (or BASE) theorem; a network partitioning (P) in a distributed computer system, choosing between availability (A) and consistency (C), but else (E), choosing between latency (L) and consistency (C) (or PACELC) theorem). However, such approaches may not be suited for implementation of CDC on very large geographically distributed no-master NoSQL data storage stores.

SUMMARY

The present embodiments relate to implementing change data capture (CDC) data across a large scale (e.g., planet scale) network of no-master data stores. A first exemplary embodiment provides a method. The method can include obtaining, from each of a plurality of client nodes in a network environment, a time to obtain data packets from each of the plurality of NoSQL data storage nodes. The method can also include identifying, from the obtained times to obtain data packets, a maximum time duration for each of the plurality of NoSQL data storage nodes to provide the data packets to each client node. The method can also include selecting a second NoSQL data storage node as an optimized data storage node by determining that the second NoSQL data storage node has a lowest maximum time duration to provide the data packets to any client node. A specialized node can be established at a computing device collocated with the first NoSQL data storage node.

The method can also include obtaining change data from a first client node of the plurality of client nodes. The method can also include forwarding the change data to the second NoSQL data storage node. The second NoSQL data storage node can be configured to provide the change data to the specialized node containing a hash map mapping all change data. The method can also include obtaining a change confirmation from the specialized node via the second NoSQL data storage node. The change confirmation can identify that the change data has been updated to the hash map.

In some embodiments, the change data is obtained from a second NoSQL data storage node of the plurality of NoSQL data storage nodes. In some embodiments, the network environment includes a planet-scale network environment. In some embodiments, the change data comprises change data capture (CDC) data. In some embodiments, the method includes forwarding the change confirmation to a third NoSQL data storage node coordinate the change data across the plurality of NoSQL data storage nodes.

In some embodiments, the method includes detecting a triggering event relating to the first NoSQL data storage node. The method can also include, responsive to detecting the triggering event, obtaining, from each of the plurality of client nodes, updated times to obtain data packets from each of the plurality of NoSQL data storage nodes. The method can also include identifying, from the obtained times to obtain data packets, updated maximum time durations for each of the plurality of NoSQL data storage nodes to provide the data packets to each client node. The method can also include selecting a fourth NoSQL data storage node as the optimized data storage node responsive to determining that the fourth NoSQL data storage node has the lowest maximum time duration.

In some embodiments, the specialized node is a change data capture node, and the specialized node can be configured to periodically transfer a portion of hash map data to a disk persistent store and remove the portion of the hash map data from the hash map.

Another embodiment relates to a data storage node. The data storage node can include a processor and a computer-readable medium including instructions that, when executed by the processor, cause the processor to establish a specialized node collocated with the data storage node, the data storage node selected as an optimized data storage node. The processor can also be caused to obtain change data capture (CDC) data from a first client node of a plurality of client nodes. The processor can also be caused to forward the CDC data to the specialized node to update a hash map of change data with the obtained CDC data.

The processor can also be caused to receive a change confirmation from the specialized node, the change confirmation identifying that the CDC data has been included in the hash map. The processor can also be caused to provide the change confirmation to other data storage nodes of a plurality of data storage nodes for coordination of the CDC data across the plurality of data storage nodes.

In some embodiments, the non-transitory computer-readable medium further causes the processor to obtain, from each of the plurality of client nodes, a time to obtain data packets from each of the plurality of data storage nodes. The processor can also be caused to identify, from the obtained times to obtain data packets, a maximum time duration for each of the plurality of data storage nodes to provide the data packets to each client node. The processor can also be caused to select the data storage node as the optimized data storage node responsive to determining that the data storage node has a lowest maximum time duration.

In some embodiments, the specialized node is a change data capture (CDC) node, and wherein the specialized node is configured to periodically transfer a portion of hash map data to a disk persistent store and remove the portion of the hash map data from the hash map. In some embodiments, the portion of hash map data is transferred to the disk persistent store using least recently used (LRU) data replacement.

Another embodiment relates to a non-transitory computer-readable medium. The non-transitory computer-readable medium includes stored thereon a sequence of instructions which, when executed by a processor causes the processor to execute a process. The process can include receiving, from each of a plurality of client nodes in a network environment, a time to obtain data packets from each of a plurality of NoSQL data storage nodes in the network environment. The process can also include deriving, for each of the plurality of NoSQL data storage nodes, a time metric indicative a time to provide data packets to each of the plurality of client nodes. The process can also include selecting a first NoSQL data storage node as an optimized data storage node based at least in part on the time metrics, wherein a specialized node is established at a computing device collocated with the first NoSQL data storage node.

The process can also include obtaining change data from a first client node of the plurality of client nodes. The process can also include forwarding the change data to the first NoSQL data storage node, the first NoSQL data storage node configured to provide the change data to the specialized node containing a hash map mapping all change data. The process can also include obtaining a change confirmation from the specialized node via the first NoSQL data storage node, the change confirmation identifying that the change data has been updated to the hash map.

In some embodiments, the time metric for each plurality of NoSQL data storage nodes indicates a maximum time duration to provide data packets to any of the plurality of client nodes, wherein selecting the first NoSQL data storage node as the optimized data storage node includes identifying that a first time metric for the first NoSQL data storage node includes a lowest maximum time duration relative to any other time metric for the plurality of NoSQL data storage nodes.

In some embodiments, the change data is obtained from an intermediate NoSQL data storage node of the plurality of NoSQL data storage nodes. In some embodiments, the network environment includes a planet-scale network environment. In some embodiments, the change data comprises change data capture (CDC) data. In some embodiments, the process further comprises forwarding the change confirmation to a second NoSQL data storage node to consistently provide the change data across the plurality of NoSQL data storage nodes.

In some embodiments, the process further comprises detecting a triggering event relating to the first NoSQL data storage node. The process can also include, responsive to detecting the triggering event, obtaining, from each of the plurality of client nodes, updated times to obtain data packets from each of the plurality of NoSQL data storage nodes. The process can also include identifying, from the obtained times to obtain data packets, updated maximum time durations for each of the plurality of NoSQL data storage nodes to provide the data packets to each client node. The process can also include selecting a third NoSQL data storage node as the optimized data storage node responsive to determining that the third NoSQL data storage node has the lowest maximum time duration.

In some embodiments, the triggering event includes any of detecting that a new client node is included in the network environment or determining that a time period for periodically updating the optimized data storage node has expired. In some embodiments, the specialized node is a change data capture node, and wherein the specialized node is configured to periodically transfer a portion of hash map data to a disk persistent store and remove the portion of the hash map data from the hash map using least recently used (LRU) data replacement.

DETAILED DESCRIPTION

Figure 1:
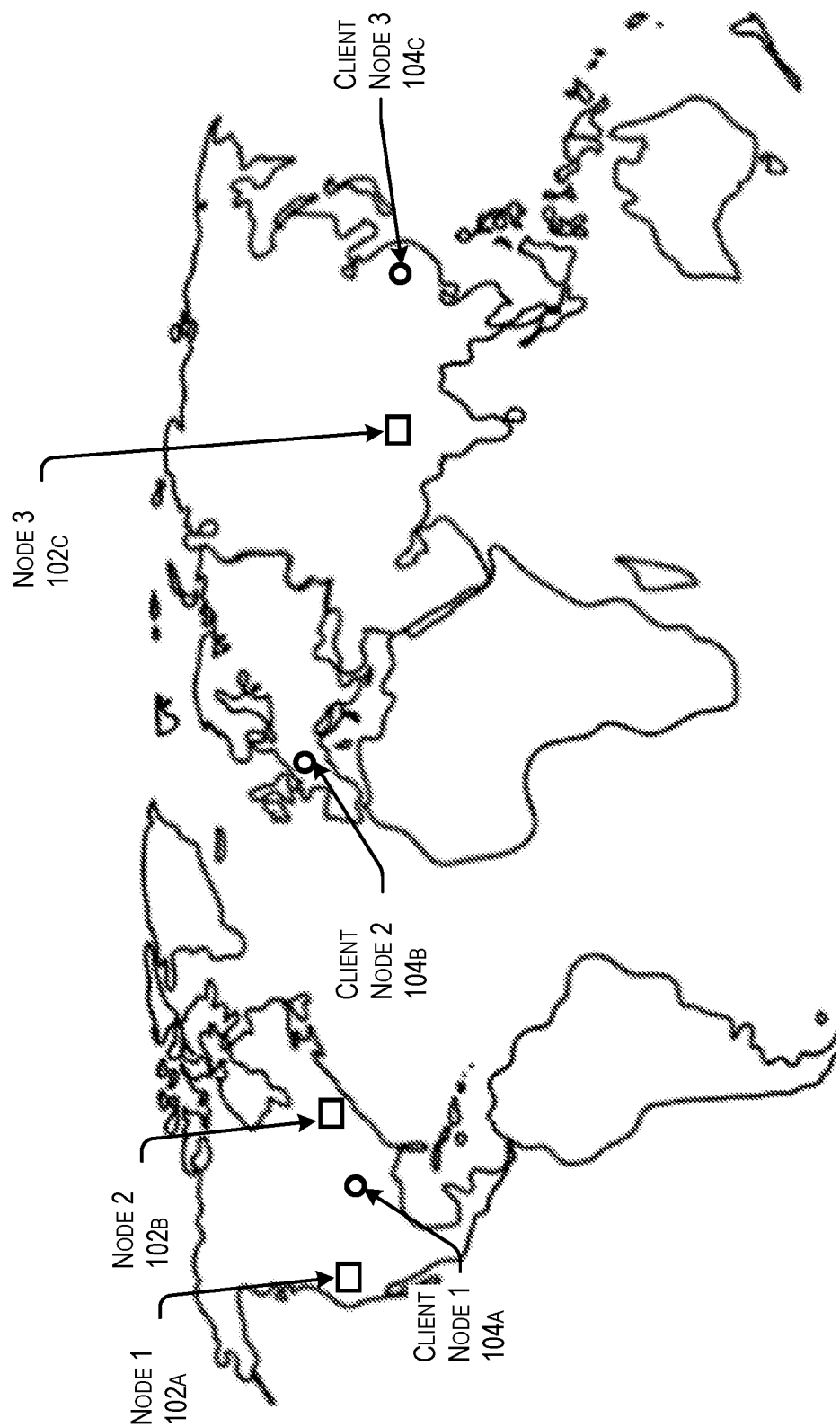
FIG. 1 illustrates an example large-scale system including a plurality of data storage nodes and client nodes, according to at least one embodiment.

The present embodiments relate to implementing change data on no-master (or NoSQL) data stores. Particularly, the present embodiments relate to identifying an optimized node from a plurality of NoSQL data storage nodes and establishing a specialized node connected (e.g., collocated) to the optimized node. The specialized node can maintain change data capture (CDC) data provided by client nodes in a hash map that can be used as a point of truth for coordinating CDC data across the plurality of NoSQL data storage nodes.

A "no-master" data storage node as described herein can include a storage node (e.g., a computing device or virtual machine instance implementing one or more database instances) that is not associated with a coordinating (or "master") node that is configured to provide coordination of data between nodes in a network. An example no-master data storage node can include a NoSQL data storage node. A NoSQL data storage node as described herein can include a non-relational storage node that can be non-tabular and can store data differently than nodes implementing relational tables.

The present embodiments can identify and coordinate read/write data (e.g., all read-write data) obtained from multiple client devices in a geographically separated large-scale (e.g., planet scale, also known as global scale) system to identify change data in a distributed data store. Clients may read from a specialized node established at an optimized node that can be used to identify all change data. The specialized node can be set in a high availability (HA) mode and the specialized node can be separated from the NoSQL data storage nodes (e.g., collocated with an optimized NoSQL data storage node. The specialized data can provide read data to devices in the large-scale system and update any change occurring across the nodes to act as the single point of truth for all data changes that have happened on the no-master data stores.

The specialized node can maintain a hash map of all changes identified across the large-scale system. Further, to ensure consistency of change data across nodes, a location of the specialized node can be periodically re-calculated to determine whether to change the specialized node to be associated with another NoSQL data storage node. The specialized node can store all change data for a period of time and periodically move data to a persistent disk store and purge the data at the specialized node.

As an illustrative example, a system can include a plurality of non-Structured Query Language (NoSQL) data storage nodes disposed across a region. For example, the NoSQL data storage nodes can be disposed about the planet, with a first node in San Jose, a second node in New York, and a third node in New Delhi. The NoSQL data storage nodes and client nodes can be connected via a plurality of networks across the region.

A first node of the plurality of NoSQL data storage nodes can identify other plurality of NoSQL data storage nodes and a geographic position (e.g., longitude, latitude, altitude) of each plurality of NoSQL data storage node. The first node can also identify a plurality of client nodes and geographic positions of the client nodes. The client nodes can be configured to access data in the plurality of NoSQL data storage nodes or provide change data capture (CDC) data, for example.

Each client device can send a request for data from each of the plurality of NoSQL data storage nodes and identify a time to obtain data from each NoSQL data storage node. As network capabilities over a region (e.g., the planet) can differ, identifying a time to obtain data from each NoSQL data storage node can be utilized in identifying an optimized node. For example, the optimized node can be selected as a node with a lowest maximum time duration to provide data to any client node.

A specialized node can be established as connected (e.g., collocated) with the optimized NoSQL data storage node. For instance, a specialized node collocated with the optimized NoSQL data storage node can include the specialized node being executed on one or more computing devices within a threshold proximity (e.g., 100 meters) of computing devices of the optimized NoSQL data storage node, specialized node being executed on one or more computing devices in a same data center as computing devices of the optimized NoSQL data storage node, or the specialized node being executed on one or more computing devices with a communication latency below a threshold value with computing devices of the optimized NoSQL data storage node.

The specialized node can maintain a hash map to incorporate any change data (CDC data) provided by client nodes. For example, a first client node can provide CDC data to a NoSQL data storage node and the NoSQL data storage node can forward the CDC data to the specialized node via the optimized NoSQL data storage node. The specialized node can update a hash map to include the CDC data to act as a point of truth for change data across the system. The specialized node can notify the NoSQL data storage nodes of the change data to coordinate change data across the system.

The present embodiments can improve accuracy of change data captured across a large-scale system and improve consistency of data across nodes in the system. Particularly, the specialized node can maintain a repository (e.g., hash map) of change data obtained from client nodes across the system, providing a point of truth in coordinating change data or reconciling any inconsistencies across the nodes. Further, the embodiments as described herein can mitigate problems in distributed computing systems (e.g., "Byzantine Faults") by establishing a specialized node to coordinate change data, rather than implementing distributed consensus techniques. Additionally, the NoSQL data storage nodes are not required to update or modify a consistency mechanism or design, and the embodiments as described herein can be utilized with any no-master data store types.

A. System Overview

FIG. 1 illustrates an example large-scale system 100 including a plurality of data storage nodes and client nodes. The system can include a plurality of data storage nodes (e.g., NoSQL data storage nodes) included as part of a large-scale (e.g., planet-scale) system.

Each data storage node can comprise one or more interconnected computing devices disposed within an environment (e.g., a collocation center, data center). For example, in the example as illustrated in FIG. 1, a first NoSQL data storage node 102a can be located in San Jose, a second NoSQL data storage node 102b can be located in New York, and a third NoSQL data storage node 102c can be located in New Delhi.

Additionally, the system 100 can include one or more client nodes 104a-c. Client nodes 104a-c can include computing devices associated with operators maintaining the data storage nodes or clients interacting with the data storage nodes.

The nodes in the system can be connected via one or more networks. However, in many instances, networks connecting the nodes can have differing capabilities (e.g., network throughput, bandwidth availability) for data transmission. In addition to differing geographic distances between nodes in the system, delays may exist in data transmission across the nodes in the system. For example, data communication between a first data storage node in San Jose and a second data storage node in New York can be faster than data communication between the second data storage node in New York and a third second data storage node in New Delhi. The delays in data communication and differing communication times between nodes in the system 100 can lead to inconsistent coordination of change data between data storage nodes in the system 100.

In some embodiments, the nodes within the system 100 can be represented in a 3-dimensional (3D) space, with a longitude, latitude, and altitude being represented for each node. The dimensions of the nodes within the 3D space can represent a location of all nodes in the system and can provide insights into the geographic distances between the nodes in the system.

B. Optimized Node Identification

In the system comprising a plurality of no-master data storage nodes, a node can be identified as an optimized node. The optimized node can include a no-master data storage node with minimized data transfer delays to all other nodes in the system. The optimized node can have a specialized node connected to (e.g., collocated with) the optimized node.

Figure 2:
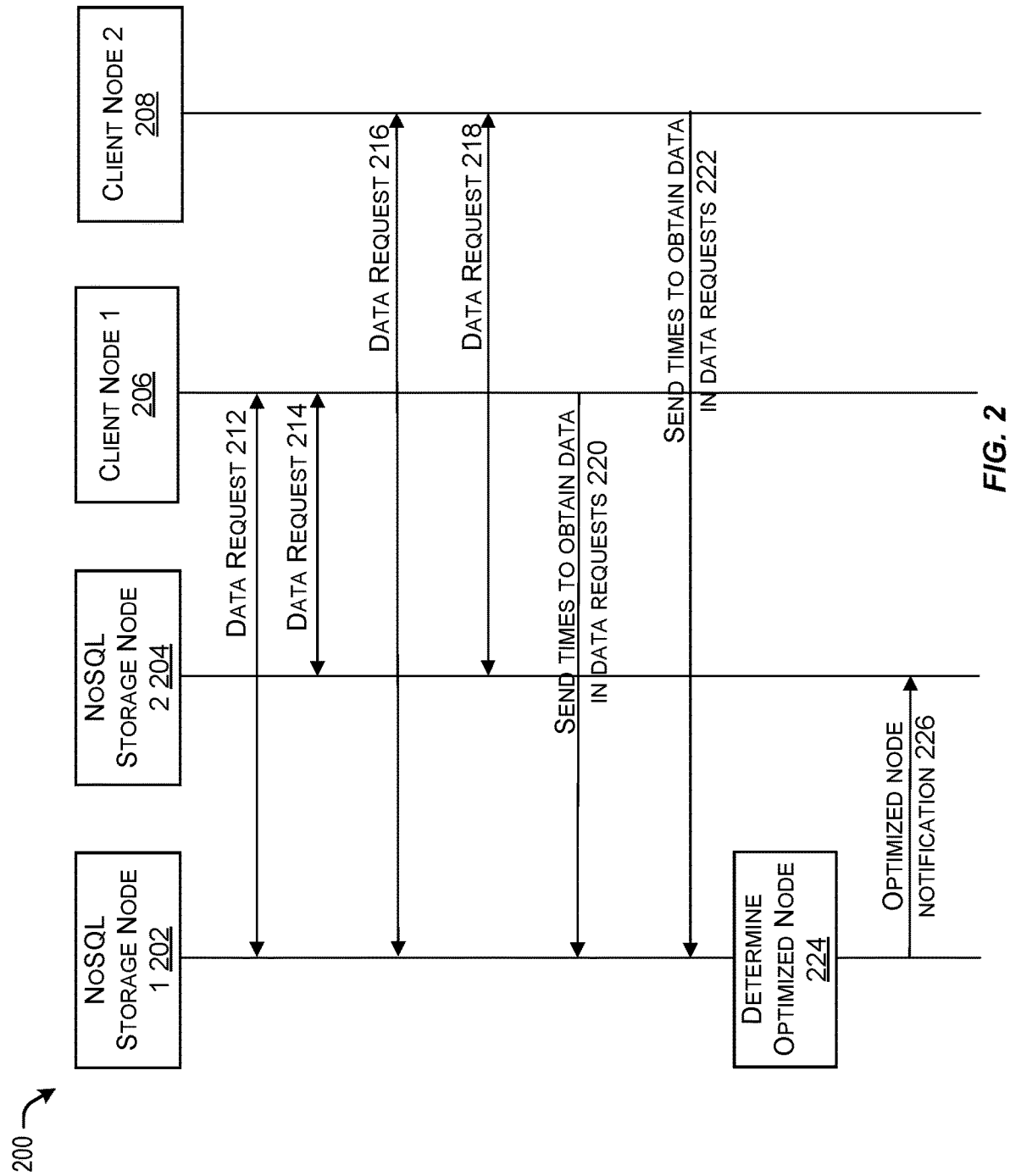
FIG. 2 is a signaling process illustrating a process for determining an optimized node, according to at least one embodiment.

FIG. 2 is a signaling process 200 illustrating a process for determining an optimized node. As shown in FIG. 2, a system can include a first NoSQL storage node 202, a second NoSQL storage node 204, a first client node 206, and a second client node 208. The nodes within the system can establish a connection by transferring data between nodes via one or more networks.

At 212, the first client node 206 can request data from the first NoSQL storage node 202. The request for data can include a null message requesting test data packets to track a time to obtain the test data packets from the first NoSQL storage node. The first client node identify a time to obtain the data from the first NoSQL storage node.

Similarly, at 214, the first client node 206 can request data from the second NoSQL storage node 204. The time to obtain data from the first NoSQL storage node can differ from the time to obtain data from the second NoSQL storage node due to various factors, such as network capabilities, geographic distance between nodes, etc. The first client node can assemble a listing of times to obtain test data packets from each NoSQL storage node that can be sent to a NoSQL storage node as specified in block 220.

At 216, a second client node 208 can request data from the first NoSQL storage node 202. Similarly, at block 218, the second client node 208 can request data from the second NoSQL storage node 204. The times to obtain data from the NoSQL storage nodes can be used to select an optimized node as described below.

At 220, the first NoSQL storage node 202 can obtain the time to receive the requested data from the NoSQL storage nodes from client node 1 202. Similarly, at block 222, the first NoSQL storage node 202 can obtain the time to receive the requested data from the NoSQL storage nodes from client node 2 204. The times to receive the requested data from the NoSQL storage nodes can indicate a time, identified by each client node, to obtain the requested data from each NoSQL storage node. While the first NoSQL storage node can obtain the times to receive the requested data from the client nodes and determine an optimized node, any NoSQL storage node can perform the steps as described herein.

At block 224, the first NoSQL storage node 202 can determine the optimized node. The optimized node can include a node with a lowest delay in data communication with the client nodes. The optimized node can be selected to have a specialized node established at a computing device connected to (e.g., collocated with) the first NoSQL storage node to maintain a listing of all change data for coordination of change data across the system.

The optimized node can be selected to include a NoSQL storage node with a lowest maximum time duration to provide data to each client device. In other words, the optimized node can include a NoSQL storage node with a shortest time duration to provide test data packets to any client node. In some instances, all values included in the received time durations can be sorted per NoSQL storage node, using sorting methods such as heap sort/merge sort in an ascending order. This can result in a maximum time that any one client node took to obtain data from a NoSQL storage node.

In some embodiments, a dataset consisting of the max times derived from the received time data can be created. The dataset can be sorted to get a maximum times that was required to get the NoSQL storage node which had a lowest maximum time. As time is directly proportional to distance and other distributed parameters, the least time taken to reach a particular node among all the other nodes can be derived. The node with the least time taken can include the optimized node in the cluster of the NoSQL nodes as described herein.

In some embodiments, an average time duration or a median time duration to provide data to each client device can be calculated and utilized in determining an optimized node. A detailed example for determining an optimized node is discussed with respect to FIG. 3.

At 226, the first NoSQL storage node 202 can notify other NoSQL storage nodes of the optimized node. For example, responsive to determining that the first NoSQL storage node 202 is the optimized node, the first NoSQL storage node 202 can forward an optimized node notification to the second NoSQL storage node 204.

Figure 3:
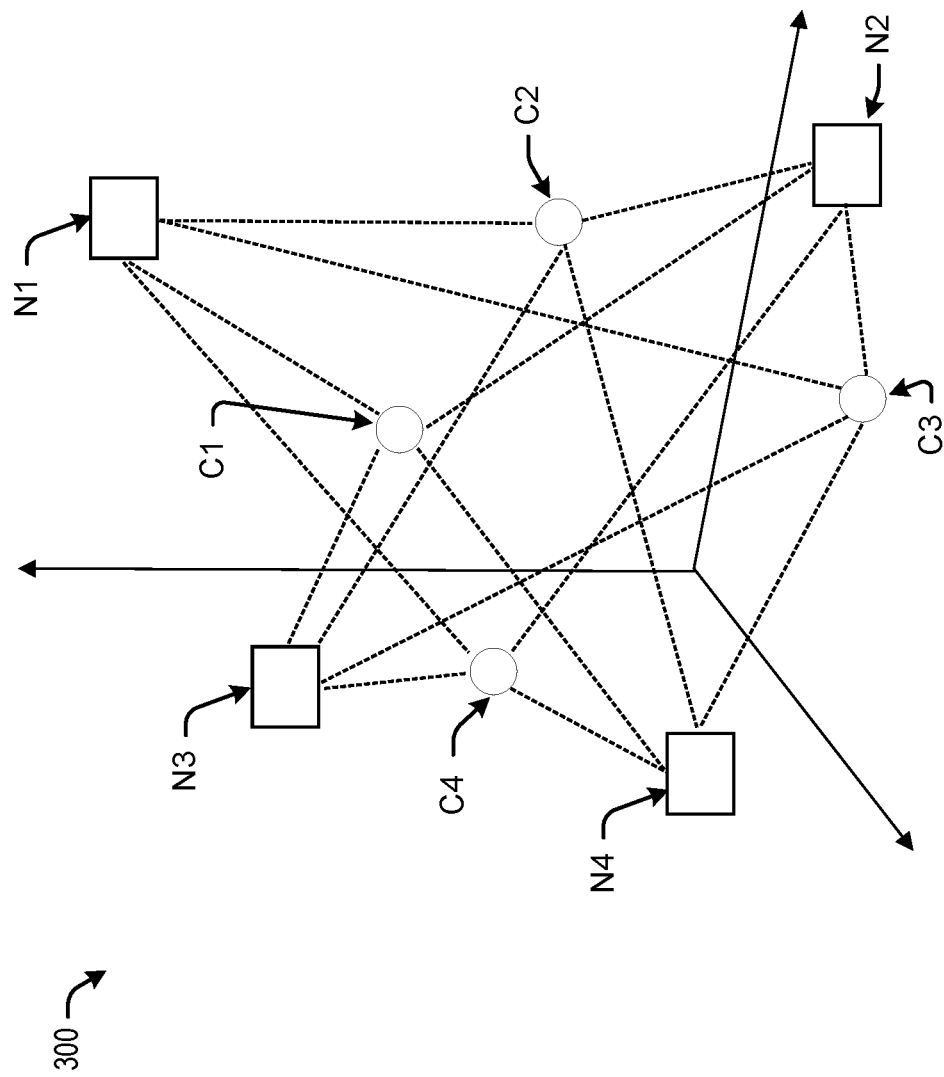
FIG. 3 illustrates a 3-Dimensional (3D) coordinate plane providing a number of NoSQL storage nodes and client nodes as part of a system, according to at least one embodiment.

FIG. 3 illustrates a 3-Dimensional (3D) coordinate plane 300 providing a number of NoSQL storage nodes and client nodes as part of a system. As shown in FIG. 3, nodes included in the system can include NoSQL storage nodes N1, N2, N3, N4 and, client nodes C1, C2, C3, C4. The NoSQL storage nodes and client nodes can be represented in 3-D coordinates in the coordinate plane representing a longitude, latitude, altitude of a geographic location of each node.

Each client node can determine a time to obtain data from each NoSQL storage node. A time for each client device to obtain test data packets from each NoSQL storage node can be derived by each client device. For example, a time for each client node to reach node N1 can include 5 ms, 6 ms, 7 ms, and 8 ms; a time to reach node N2 by each client node can include 15 ms, 26 ms, 27 ms, and 9 ms; a time to reach node N3 by each client node can include 11 ms, 5 ms, 58 ms, and 9 ms; and a time to reach node N4 by each client node can include 10 ms, 34 ms, 38 ms, and 56 ms.

In this example, a maximum time to provide data by each node can be determined. The maximum time as disclosed herein can comprise a metric (or a time metric) for each client node. For example, a maximum time duration for N1 to provide data to any client node can include 8 ms; maximum time duration for N2 to provide data to any client node can include 27 ms; maximum time duration for N3 to provide data to any client node can include 58 ms; and a maximum time duration for N14 to provide data to any client node can include 56 ms. The first NoSQL storage node can compare the maximum time durations and determine that the maximum time duration for N1 (8 ms) is less than maximum time durations for nodes N2 (27 ms), N3 (58 ms), and N4 (56 ms).

C. Coordinating Change Data Using a Specialized Node and an Optimized Node

Responsive to determining the optimized node, a specialized node can be established as connected to the optimized node. The specialized node can include a module executing on one or more interconnected computing devices collocated with the optimized node. The specialized node can maintain a listing of all change data (CDC data) obtained from client device(s) across the large-scale system and can provide a point of truth of all change data to reconcile any inconsistencies in change data across NoSQL storage nodes in the large-scale system.

Figure 4:
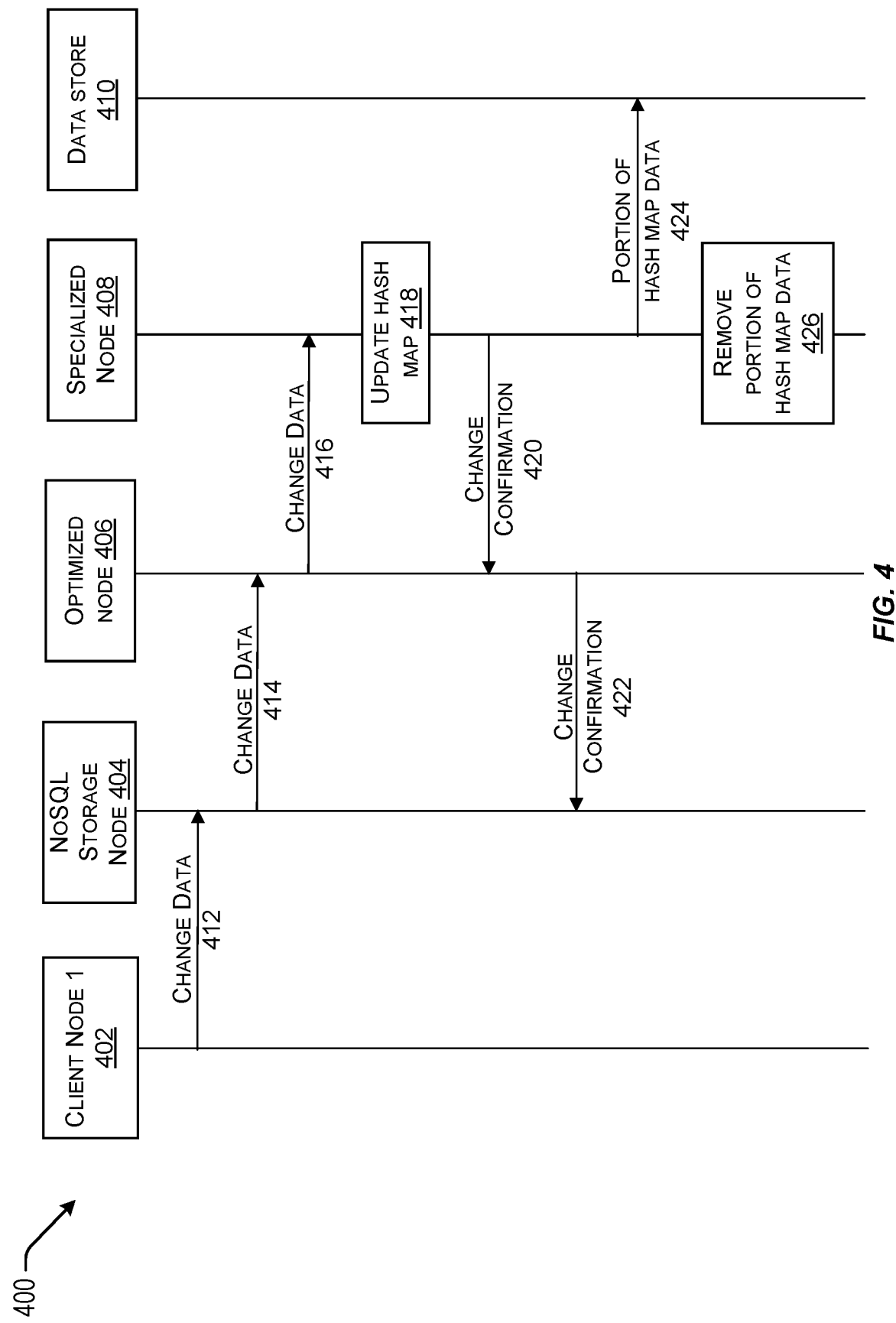
FIG. 4 is a signaling process for coordinating change data using a specialized node, according to at least one embodiment.

FIG. 4 is a signaling process 400 for coordinating change data using a specialized node. At 412, the client node 402 can provide change data (CDC data) to NoSQL storage node 404. While only one instance of change data is provided in the example as illustrated in FIG. 4, any number of change data instances can be obtained from a plurality of client devices.

At 414, the NoSQL storage node 404 can forward the change data to the optimized node 406. Each NoSQL storage node can be configured to forward change data to the optimized node responsive to obtaining a notification of the optimized node.

At 416, the optimized node 406 can provide the change data to the specialized node 408. As noted above, the specialized node can include a listing of change data (e.g., a hash map) to maintain change data obtained from client devices in the system.

At block 418, the specialized node 408 can update a hash map to incorporate the change data. The update to the hash map can map the change data to a timestamp indicative of a time of obtaining the change data, a client node providing the change data, a client associated with the change data, etc. The hash map can provide a repository of all change data obtained by the storage nodes in the system. Further, the hash map can provide a point of truth to reconcile any inconsistencies in change data at various NoSQL storage nodes.

At 420, the specialized node 408 can send a change confirmation to the optimized node 406 confirming the addition of the change data to the hash map. The optimized node 406 can update an internal listing/table of change data to incorporate the change data or confirm the addition of the change data to the internal listing/table of change data.

In some instances, the NoSQL storage nodes (e.g., NoSQL storage node 404, optimized node 406) can include a NoSQL store with a consistency model (e.g., a tunable consistency model, eventual consistency model, strong consistency model). The consistency model can be used to provide change data across all nodes/tables/schemas/shards in the cluster of NoSQL storage nodes. The consistency model can modify how the change data is provided and stored across the NoSQL storage nodes in the network.

At 422, the optimized node 406 can forward the change confirmation to other NoSQL storage nodes (e.g., 404). The NoSQL storage node 404 can also update an internal listing/table of change data to incorporate the change data or confirm the addition of the change data to the internal listing/table of change data. In some instances, if there is an inconsistency between the internal listing/table of change data and the change data identified in the change confirmation, the NoSQL storage node 404 can request the change data from the specialized node 408 and update the internal listing/table of change data to include the requested change data.

At 424, the specialized node 408 can periodically send a portion of the hash map data to a data store 410 (e.g., a persistent disk store). The specialized node 408 can periodically purge a portion of hash map data from the hash map to allow for efficient updating of the hash map with subsequent change data. Initiating the removal of the hash map can be periodic or based on the hash map including a threshold amount of data, for example.

At block 426, the specialized node 408 can remove the portion of the hash map data sent to the data store 410. This can be performed responsive to sending the portion of the hash map data to the data store 410 in block 424.

In some embodiments, the optimized node can be periodically re-calculated and transitioned to another node. For example, responsive to detecting a change in the client nodes in the system (e.g., removal or addition of a client node), the optimized node calculation process described above can be repeated. As another example, the optimized node calculation process can be periodically or randomly performed. If it is determined that the optimized node is to remain with the current NoSQL storage node, no action may be taken. If it is determined that the optimized is to change from the current NoSQL storage node to another NoSQL storage node, the specialized node can be removed at the collocation with the current NoSQL storage node and the specialized node can be re-established at a collocation with the new NoSQL storage node.

Figure 5:
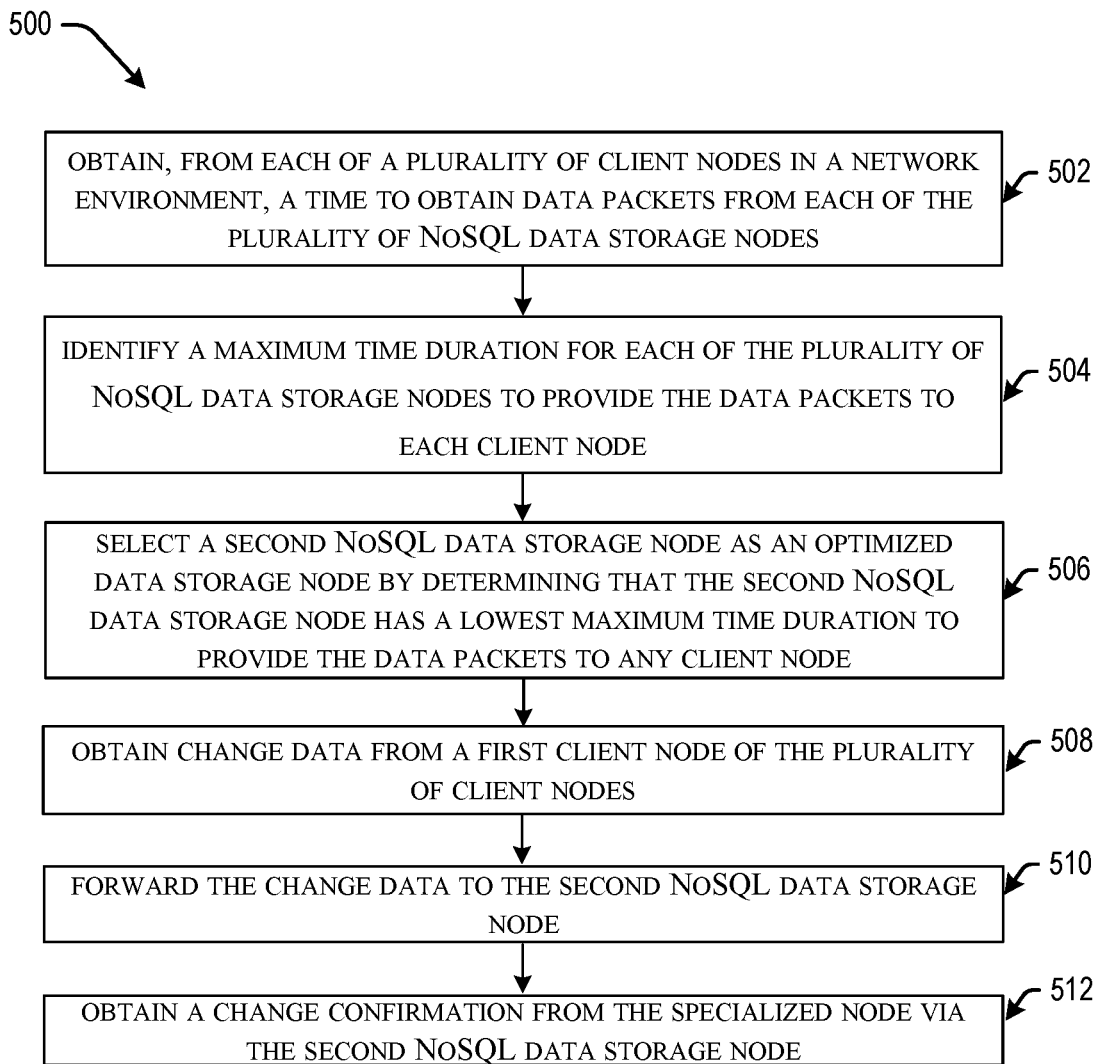
FIG. 5 is a block diagram illustrating an example method for coordinating change data across a plurality of NoSQL data storage nodes, according to at least one embodiment.

FIG. 5 is a block diagram 500 illustrating an example method for coordinating change data across a plurality of NoSQL data storage nodes. A network environment can include a planet-scale network environment with a plurality of NoSQL data storage nodes and a plurality of client nodes. A first non-Structured Query Language (NoSQL) data storage node of the plurality of NoSQL data storage nodes can perform the method as described herein.

At block 502, the first NoSQL data storage node can obtain, from each of a plurality of client nodes in a network environment, a time to obtain data packets from each of the plurality of NoSQL data storage nodes.

At block 504, the first NoSQL data storage node can identify a maximum time duration for each of the plurality of NoSQL data storage nodes to provide the data packets to each client node.

At block 506, the first NoSQL data storage node can select a second NoSQL data storage node as an optimized data storage node by determining that the second NoSQL data storage node has a lowest maximum time duration to provide the data packets to any client node. The specialized node can be established at a computing device collocated with the first NoSQL data storage node responsive to selecting the second NoSQL data storage node as the optimized data storage node.

The specialized node can include a change data capture node. The specialized node can be configured to periodically transfer a portion of hash map data to a disk persistent store and remove the portion of the hash map data from the hash map.

At block 508, the first NoSQL data storage node can obtain change data from a first client node of the plurality of client nodes. The change data can be obtained directly at first NoSQL data storage node or obtained from an intermediate NoSQL data storage node of the plurality of NoSQL data storage nodes. The change data can include change data capture (CDC) data.

At block 510, the first NoSQL data storage node can forward the change data to the second NoSQL data storage node. The second NoSQL data storage node can be configured to provide the change data to the specialized node containing a hash map mapping all change data.

At block 512, the first NoSQL data storage node can obtain a change confirmation from the specialized node via the second NoSQL data storage node. The change confirmation can identify that the change data has been updated to the hash map. In some embodiments, the first NoSQL data storage node can forward the change confirmation to other NoSQL data storage node (e.g., a third NoSQL data storage node) to coordinate the change data across the plurality of NoSQL data storage nodes.

In some embodiments, the optimized node selection process as described herein can be periodically re-calculated to determine whether to change the optimized node to another NoSQL data storage node. For instance, the first NoSQL data storage node can detect a triggering event relating to the second NoSQL data storage node. The triggering event can include any of detecting that a new client node is included in the network environment or determining that a time period for periodically updating the optimized data storage node has expired.

Responsive to detecting the triggering event, the first NoSQL data storage node can obtain, from each of the plurality of client nodes, updated times to obtain data packets from each of the plurality of NoSQL data storage nodes and identify updated maximum time durations for each of the plurality of NoSQL data storage nodes to provide the data packets to each client node. The first NoSQL data storage node can select a third NoSQL data storage node as the optimized data storage node responsive to determining that the third NoSQL data storage node has the lowest maximum time duration.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
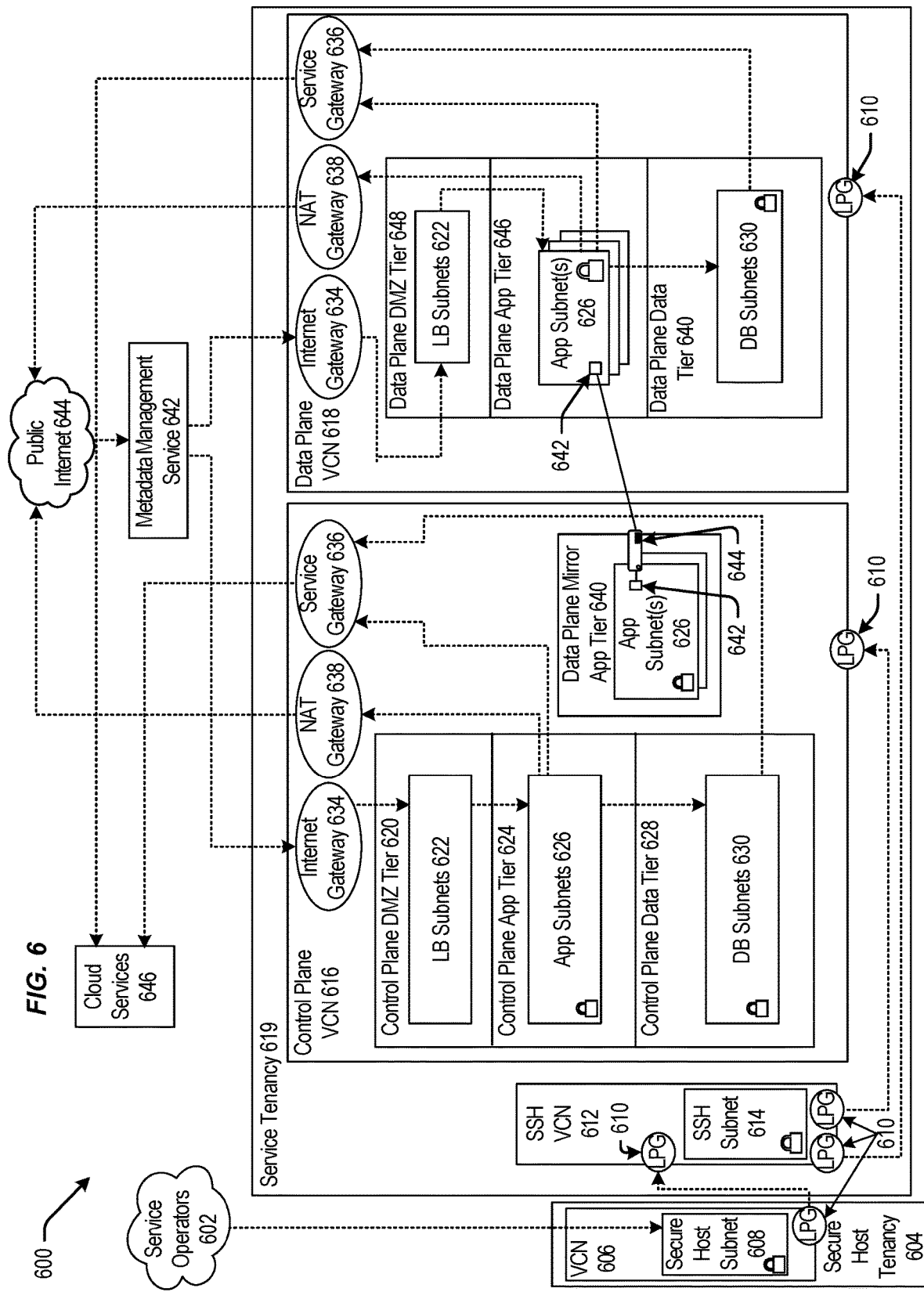
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
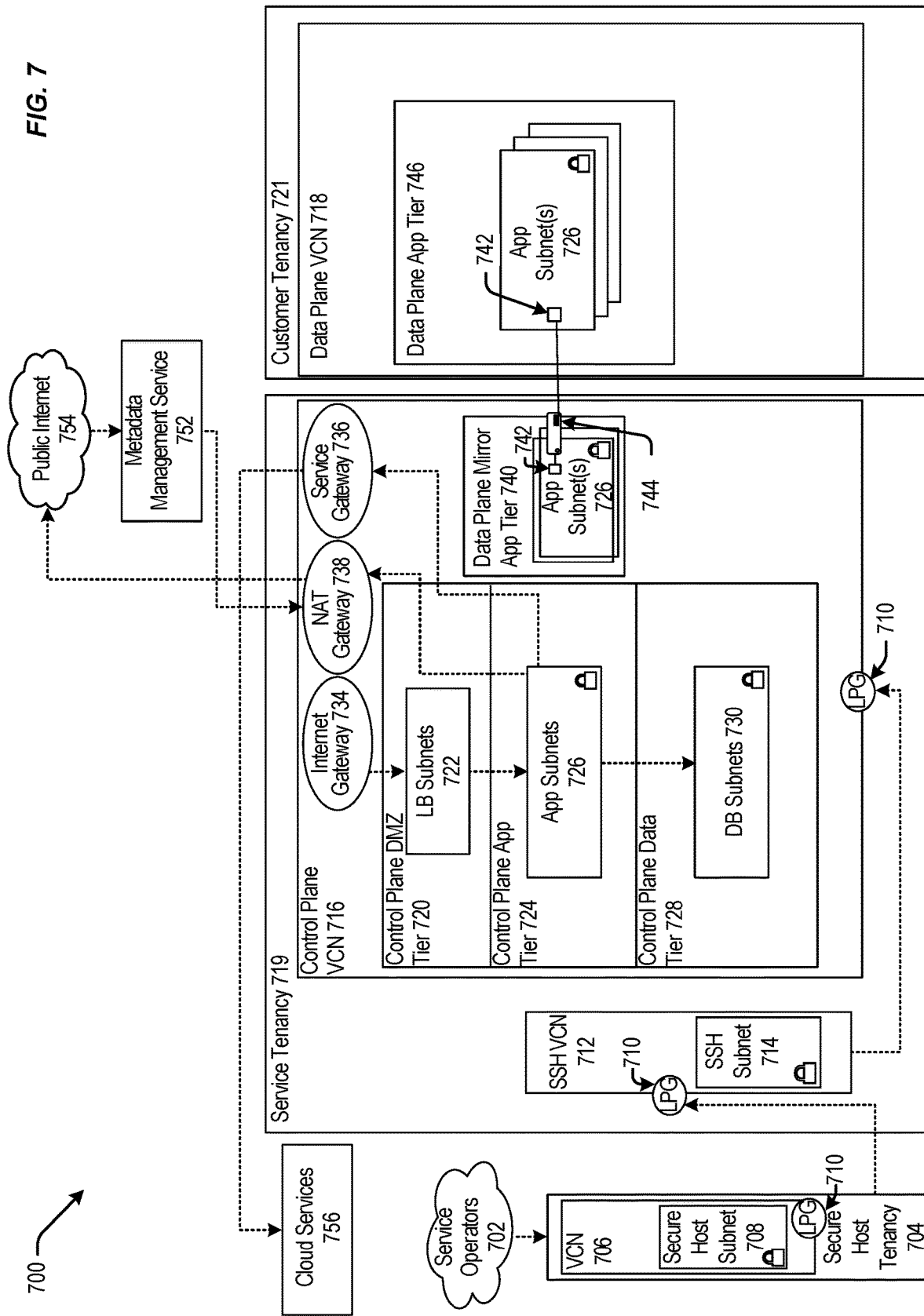
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
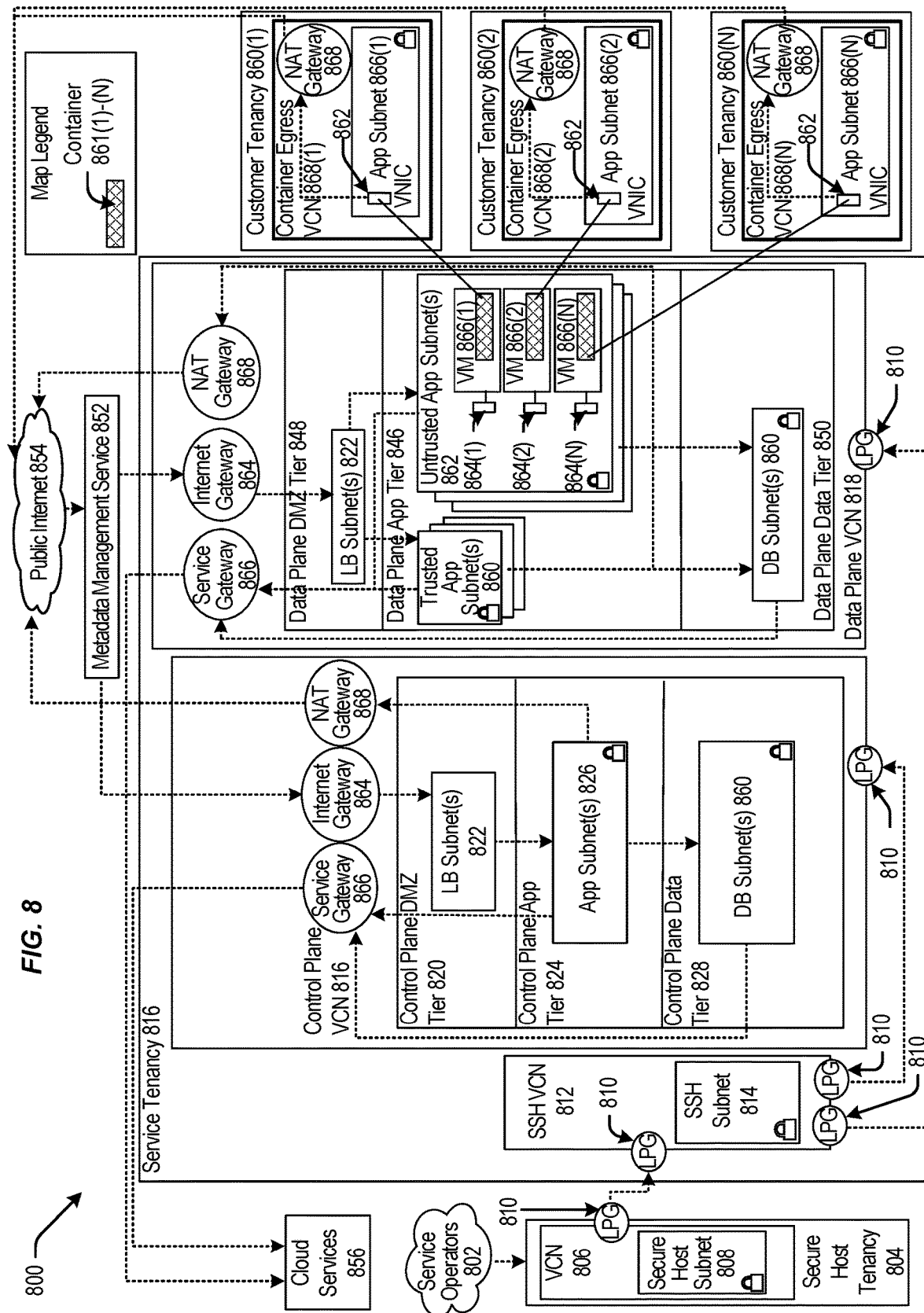
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
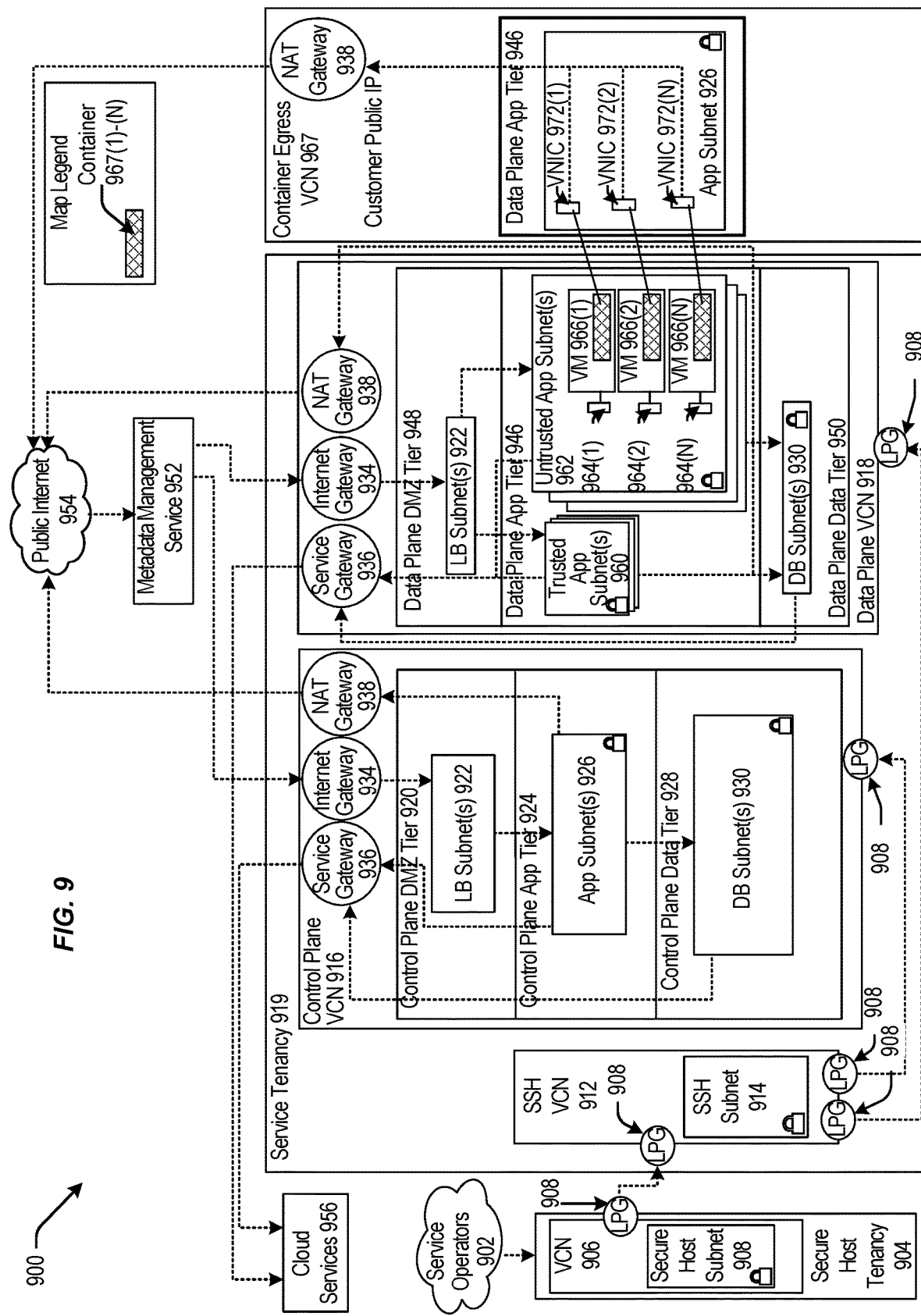
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
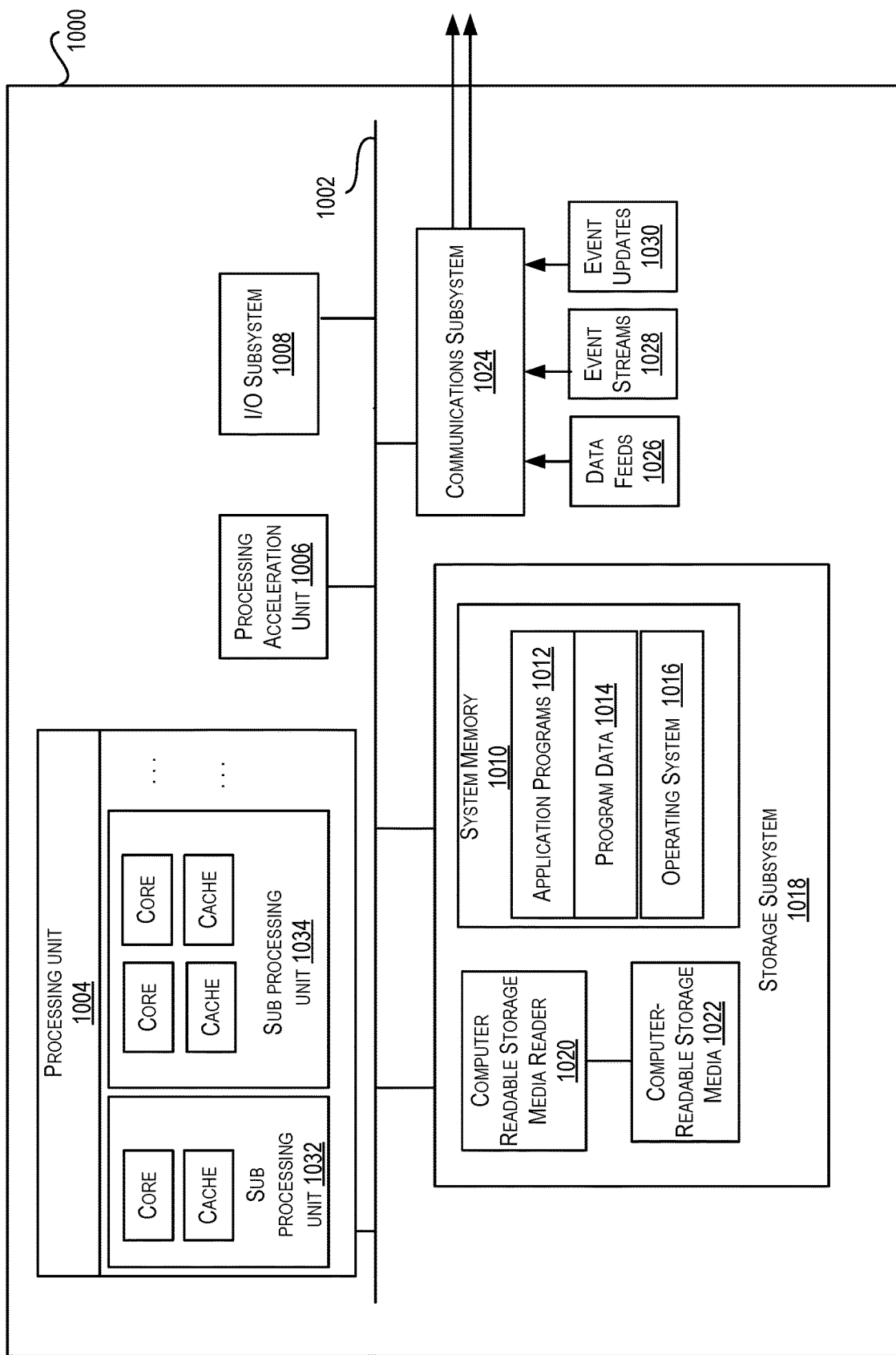
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A method for coordinating change data across a plurality of non-Structured Query Language (NoSQL) data storage nodes, the method comprising:
   obtaining, from each of a plurality of client nodes in a network environment, a time to obtain data packets from each of the plurality of NoSQL data storage nodes;
   identifying, from the obtained times to obtain data packets, a maximum time duration for each of the plurality of NoSQL data storage nodes to provide the data packets to any of the plurality of client nodes;
   selecting a first NoSQL data storage node as an optimized data storage node by determining that the first NoSQL data storage node has a lowest maximum time duration to provide the data packets to any client node, wherein a specialized node is established at a computing device collocated with the first NoSQL data storage node;
   obtaining change data from a first client node of the plurality of client nodes;
   forwarding the change data to the first NoSQL data storage node, the first NoSQL data storage node configured to provide the change data to the specialized node containing a hash map configured to map change data; and obtaining a change confirmation from the specialized node via the first NoSQL data storage node, the change confirmation identifying that the change data has been updated to the hash map.

2. The method of claim 1, wherein the change data is obtained from a second NoSQL data storage node of the plurality of NoSQL data storage nodes.

3. The method of claim 1, wherein the network environment includes a planet-scale network environment.

4. The method of claim 1, wherein the change data comprises change data capture (CDC) data.

5. The method of claim 1, further comprising:
forwarding the change confirmation to a third NoSQL data storage node coordinate the change data across the plurality of NoSQL data storage nodes.

6. The method of claim 1, further comprising:
detecting a triggering event relating to the first NoSQL data storage node;
responsive to detecting the triggering event, obtaining, from each of the plurality of client nodes, updated times to obtain data packets from each of the plurality of NoSQL data storage nodes;
identifying, from the obtained times to obtain data packets, updated maximum time durations for each of the plurality of NoSQL data storage nodes to provide the data packets to each client node; and
selecting a fourth NoSQL data storage node as the optimized data storage node responsive to determining that the fourth NoSQL data storage node has the lowest maximum time duration.

7. The method of claim 1, wherein the specialized node is a change data capture node, and wherein the specialized node is configured to periodically transfer a portion of hash map data to a disk persistent store and remove the portion of the hash map data from the hash map.

8. A data storage node comprising:
a processor; and
a computer-readable medium including instructions that, when executed by the processor, cause the processor to:
establish a specialized node collocated with the data storage node, the data storage node selected as an optimized data storage node;
obtain change data capture (CDC) data from a first client node of a plurality of client nodes;
forward the CDC data to the specialized node to update a hash map of change data with the obtained CDC data;
receive a change confirmation from the specialized node, the change confirmation identifying that the CDC data has been included in the hash map; and
provide the change confirmation to other data storage nodes of a plurality of data storage nodes for coordination of the CDC data across the plurality of data storage nodes.

9. The data storage node of claim 8, wherein the non-transitory computer-readable medium further causes the processor to:
obtain, from each of the plurality of client nodes, a time to obtain data packets from each of the plurality of data storage nodes;
identify, from the obtained times to obtain data packets, a maximum time duration for each of the plurality of data storage nodes to provide the data packets to each client node;
select the data storage node as the optimized data storage node responsive to determining that the data storage node has a lowest maximum time duration.

10. The data storage node of claim 8, wherein the specialized node is a change data capture (CDC) node, and wherein the specialized node is configured to periodically transfer a portion of hash map data to a disk persistent store and remove the portion of the hash map data from the hash map.

11. The data storage node of claim 10, wherein the portion of hash map data is transferred to the disk persistent store using least recently used (LRU) data replacement.

12. A non-transitory computer-readable medium including stored thereon a sequence of instructions which, when executed by a processor causes the processor to execute a process, the process comprising:
receiving, from each of a plurality of client nodes in a network environment, a time to obtain data packets from each of a plurality of NoSQL data storage nodes in the network environment;
deriving, for each of the plurality of NoSQL data storage nodes, a time metric indicative a time to provide data packets to each of the plurality of client nodes;
selecting a first NoSQL data storage node as an optimized data storage node based at least in part on the time metrics, wherein a specialized node is established at a computing device collocated with the first NoSQL data storage node;
obtaining change data from a first client node of the plurality of client nodes;
forwarding the change data to the first NoSQL data storage node, the first NoSQL data storage node configured to provide the change data to the specialized node containing a hash map mapping all change data; and
obtaining a change confirmation from the specialized node via the first NoSQL data storage node, the change confirmation identifying that the change data has been updated to the hash map.

13. The non-transitory computer-readable medium of claim 12, wherein the time metric for each plurality of NoSQL data storage nodes indicates a maximum time duration to provide data packets to any of the plurality of client nodes, wherein selecting the first NoSQL data storage node as the optimized data storage node includes identifying that a first time metric for the first NoSQL data storage node includes a lowest maximum time duration relative to any other time metric for the plurality of NoSQL data storage nodes.

14. The non-transitory computer-readable medium of claim 12, wherein the change data is obtained from an intermediate NoSQL data storage node of the plurality of NoSQL data storage nodes.

15. The non-transitory computer-readable medium of claim 12, wherein the network environment includes a planet-scale network environment.

16. The non-transitory computer-readable medium of claim 12, wherein the change data comprises change data capture (CDC) data.

17. The non-transitory computer-readable medium of claim 12, wherein the process further comprises:
forwarding the change confirmation to a second NoSQL data storage node to consistently provide the change data across the plurality of NoSQL data storage nodes.

18. The non-transitory computer-readable medium of claim 12, wherein the process further comprises:
detecting a triggering event relating to the first NoSQL data storage node;
responsive to detecting the triggering event, obtaining, from each of the plurality of client nodes, updated times to obtain data packets from each of the plurality of NoSQL data storage nodes;

identifying, from the obtained times to obtain data packets, updated maximum time durations for each of the plurality of NoSQL data storage nodes to provide the data packets to each client node; and selecting a third NoSQL data storage node as the optimized data storage node responsive to determining that the third NoSQL data storage node has the lowest maximum time duration.

19. The non-transitory computer-readable medium of claim 18, wherein the triggering event includes any of detecting that a new client node is included in the network environment or determining that a time period for periodically updating the optimized data storage node has expired.

20. The non-transitory computer-readable medium of claim 12, wherein the specialized node is a change data capture node, and wherein the specialized node is configured to periodically transfer a portion of hash map data to a disk persistent store and remove the portion of the hash map data from the hash map using least recently used (LRU) data replacement.

* * * * *